(12) United States Patent
Emori et al.

(10) Patent No.: US 8,979,638 B2
(45) Date of Patent: Mar. 17, 2015

(54) SYSTEM AND METHOD FOR READING DATA FROM A PLURALITY OF CHIPS COMPRISING AN RFID TAG

(75) Inventors: Kazuki Emori, Tokyo (JP); Shinsuke Yamaguchi, Tokyo (JP); Toru Sugawara, Tokyo (JP); Kouichi Matsumoto, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 351 days.

(21) Appl. No.: 13/441,525

(22) Filed: Apr. 6, 2012

(65) Prior Publication Data

US 2012/0282998 A1    Nov. 8, 2012

(30) Foreign Application Priority Data

May 2, 2011   (JP) ................................. 2011-102794

(51) Int. Cl.
*A63F 9/24* (2006.01)
*G06K 7/10* (2006.01)
*G06K 17/00* (2006.01)

(52) U.S. Cl.
CPC .... *G06K 7/10039* (2013.01); *G06K 2017/0067* (2013.01)
USPC .......................................... 463/25; 340/10.1

(58) Field of Classification Search
CPC ..... G07F 17/322; G07F 17/3248; H04Q 9/00; H04Q 2209/47; G06K 19/0723; H04L 1/0061; G06F 11/08
USPC .............. 463/16, 17, 25, 47; 340/10.1, 572.7; 714/746, 755, 758, 775
See application file for complete search history.

(56) References Cited

U.S. PATENT DOCUMENTS

| | | | |
|---|---|---|---|
| 2007/0060311 A1* | 3/2007 | Rowe et al. ...................... 463/25 |
| 2009/0104981 A1  | 4/2009 | Koyama |
| 2009/0179741 A1* | 7/2009 | Hoyt et al. ................... 340/10.1 |
| 2010/0093429 A1* | 4/2010 | Mattice et al. .................. 463/25 |

FOREIGN PATENT DOCUMENTS

| | | |
|---|---|---|
| JP | 2000003420 | 1/2000 |
| JP | 2005277725 | 10/2005 |
| JP | 2008153851 | 7/2008 |
| JP | 2008228067 | 9/2008 |

OTHER PUBLICATIONS

Japanese Patent Office, Japanese Office Action dated Oct. 28, 2014 of Japanese application No. 2011-102794.

* cited by examiner

*Primary Examiner* — Damon Pierce
(74) *Attorney, Agent, or Firm* — Lexyoume IP Meister, PLLC

(57) ABSTRACT

The present application provides a system which transmits a request signal to a plurality of chips located within a communication range of an antenna, receives from a chip which has received the request signal an answer back including identification information and a plurality of error detection codes of the chip, generates a plurality of error detection codes from the identification information of the chip, detects match or mismatch of a plurality of error detection codes received and a plurality of error detection codes generated, and when, among a plurality of pairs of the error detection codes, match of a pair of error detection codes is detected and mismatch of another pair of error detection codes is detected, determines that the match of the pair of the error detection codes of the chip is misrecognition resulting from collision of a response signal.

4 Claims, 11 Drawing Sheets

SYSTEM AND METHOD FOR READING DATA FROM A PLURALITY OF CHIPS COMPRISING AN RFID TAG

CROSS-REFERENCE TO RELATED APPLICATIONS

This application claims benefit of priority based on Japanese Patent Application No. 2011-102794 filed on May 2, 2011. The contents of this application are incorporated herein by reference in their entirety.

BACKGROUND OF THE INVENTION

1. Field of the Invention

The present invention relates to a system and method for reading data from a plurality of chips comprising an RFID tag.

2. Disclosure of the Background

RFID (Radio Frequency IDentification) is a recognition method involving assigning an RFID tag (transponder) to an individual in advance, performing communication between a reader and the RFID tag by an electromagnetic wave, and thereby recording data in the RFID tag or reading data from the RFID tag. Heretofore, gaming media such as chips comprising an RFID tag are used in some gaming establishments such as casinos and pachinko halls (e.g., United States Patent Publication No. 2009/0104981).

SUMMARY OF THE INVENTION

When the RFID is applied as a gaming medium in a gaming establishment, there is the problem of avoiding collision of chips in performing communication with a plurality of chips (RFID tags) placed in relatively narrow spaces such as bet areas and chip trays in a short period of time.

In the RFID, anti-collision technologies between a plurality of RFID tags and a reader are categorized into a deterministic method and a stochastic method. In the deterministic method the reader individually inquires the individual RFID tags about identification information, and it is therefore difficult to improve a recognition speed. Meanwhile, by the stochastic method, recognition of a large number of RFID tags can be achieved even though the reader does not inquire the RFID tags about identification information.

In gaming establishments such as casinos, for example, counting of the number of gaming media is carried out in a period between the end of a game and the start of another and an interval such as dealer change.

From the perspective of not impairing players' interest and elation in the game, the shorter the intervals, the better. Therefore, the stochastic method is more preferably applied to gaming establishments such as casinos rather than the deterministic method.

However, when a large number of chips are read in a short period of time using the stochastic method, so-called ghost chips (ghost ID) are generated in some cases. Ghost chips occur because of the phenomenon that, when a plurality of RFID tags are read by a single reader, given two or more chips included in a plurality of chips are erroneously recognized as a single chip by the reader. When ghost chips occur, counting the number of the chips correctly becomes difficult.

Accordingly, in existing gaming establishments, chips comprising the RFID tags as mentioned above have been used only for determining the authenticity of chips.

An object of the present invention is to provide a system and a method which are capable of performing individual identification (counting) of chips using the RFID technology without requiring any undue computing ability with practical precision and at a practical speed.

The present invention employs the following configuration to achieve the object mentioned above.

(1) A system for reading data from a plurality of chips each comprising an RFID tag, the RFID tag provided in each of the plurality of chips comprising a memory, the memory storing intrinsic identification information of at least the chip, the system comprising:

an antenna, a request signal transmission means which transmits a request signal to a plurality of chips located in a communication range of the antenna by the antenna, the request signal designating at least 1 bit of the memory as a time slot area, an answer back receiving means which receives an answer back at a predetermined timing from a chip from which the request signal is received via the antenna transmitted for each value stored in the time slot area of the memory provided in the chip, the answer back including the identification information of the chip and a plurality of error detection codes generated from the identification information, the plurality of error detection codes being generated in the RFID tag by methods different from that of each other or generated in advance and stored in the memory, a generation means which generates the plurality of error detection codes from the identification information received by the answer back receiving means, an error detection means which detects match or mismatch between the plurality of error detection codes generated by the generation means and the plurality of error detection codes received by the answer back receiving means, a determination means which determines when, among a plurality of pairs of error detection codes, match of a pair of error detection codes is detected and mismatch of another pair of error detection codes is detected by the error detection means, and that match of the pair of error detection codes of the chip is misrecognition resulting from the collision of the answer back.

According to the configuration of (1), even when a pair of error detection codes matches, in the case where mismatch of another pair of error detection codes is detected, it is determined to be misrecognition resulting from the match of the pair of error detection codes collision of the answer back (collision), and therefore misrecognition of the chip can be detected. Accordingly, miscounting of chips can be detected, and employing a wrong counting value as a counting result can be prevented. As a result, the precision of counting of chips using RFID can be increased. A plurality of error detection codes is generated from the identification information, and therefore the data length of the error detection code does not become excessively long. As a result, the constitution of (1) is capable of performing counting of chips using the RFID technology without requiring undue computing ability and with practical precision and speed.

It should be noted that normally on a betting table provided in a gaming machine, a plurality of chips are often piled up closely in the same bet area. That is, the number of chips located within the communication range of the antenna is high. In such a situation, the probability of occurrence of ghost chips is high. This is one of the reasons that the RFID technology has not been used for counting of chips in casinos conventionally.

Therefore, the system of the present invention can be suitably used as a system for reading a plurality of chips placed in the bet area.

In addition, normally, a plurality of chips are closely accommodated in a chip tray. That is, the number of chips located within the communication range of the antenna is high. In such a situation, the probability of occurrence of ghost chips is high. This is one of the reasons that the RFID technology has not been used for counting of chips in casinos conventionally.

Therefore, the system of the present invention can be suitably used as a system for reading a plurality of chips accommodated in the chip tray.

Furthermore, the present invention can employ the following configurations:

(2) A system according to (1), in which
the plurality of chips are grouped into a plurality of groups,
the memory stores group codes which indicate the groups of the chips,
the system comprises:
a designation signal transmission means which, when match of the pair of error detection codes of the chips is determined as misrecognition by the determination means, designates a time slot value depending on the time slot area designated for the chip and a timing of receiving an answer back from the chip, and sequentially transmits a designation signal which specifies a single group to each of the groups by the antenna, and
a response signal receiving means which receives a response signal from the chip of the group designated by the designation signal via the antenna.

According to the configuration of (2), when misrecognition of chips (ghost chips) occurs, chips which have been recognized as ghost chips can be identified highly precisely. Therefore, counting with a higher precision can be realized.

(3) A method for reading data from a plurality of chips comprising an RFID tag,
the RFID tag provided in each of the plurality of chips comprising a memory,
the memory storing an intrinsic identification information of at least the chip,
the method comprising:
a request signal transmission step for transmitting a request signal to a plurality of chips located within a communication range of an antenna by an antenna, the request signal designating at least 1 bit of the memory as a time slot area,
an answer back receiving step for receiving an answer back at a predetermined timing from a chip from which the request signal is received via the antenna transmitted for each value stored in the time slot area of the memory provided in the chip, the answer back including the identification information of the chip and a plurality of error detection codes generated from the identification information, the plurality of error detection codes being generated in the RFID tag by methods different from that of each other or generated in advance and stored in the memory,
a generation step for generating the plurality of error detection codes from the identification information received in the answer back receiving step,
an error detection step for detecting match or mismatch of the plurality of error detection codes generated in the generation step and the plurality of error detection codes received in the answer back receiving step, and
a determination step for determining, when, among a plurality of pairs of the error detection codes, match of a pair of error detection codes is detected and mismatch of another pair of error detection codes is detected in the error detection step, match of the pair of error detection codes of the chip is misrecognition resulting from the collision of the answer backs.

According to the configuration of (3), as in (1), it is possible to perform counting of chips using the RFID technology without requiring undue computing ability and with practical precision and speed.

(4) The method according to (3), wherein
the plurality of chips are grouped into a plurality of groups,
the memory stores group codes which indicate the groups of the chips,
the method comprising:
a designation signal transmission step for designating, when it is determined in the determination step that match of the pair of error detection codes of the chips is misrecognition, a time slot value depending on the time slot area designated for the chip and a timing of receiving an answer back from the chip, and sequentially transmitting a designation signal which specifies a single group to each of the groups by the antenna, and
a response signal receiving step for receiving a response signal from the chip of the group designated in the designation signal via the antenna.

According to the configuration of (4), as in (2), when misrecognition of chips (ghost chips) occurs, chips which have been recognized as ghost chips can be identified highly precisely. Therefore, counting with a higher precision can be realized.

(5) A system for reading data from a plurality of chips each comprising an RFID tag,
the system comprises:
a betting table on which a plurality of bet areas are set,
an antenna provided in association with each of the plurality of bet areas, and including the bet area in its communication range,
a reading means for continuously or intermittently performing a reading process of data from each of the chips placed in each of the bet areas by each of the antennas between the termination of a game and the initiation of another,
a determination means which determines, when the same data is read for a predetermined consecutive number of times from the chip placed in the bet area by the reading means, that reading of the bet area is successful, while when the same data is not read for a predetermined consecutive number of times, determines that reading of the bet area is unsuccessful, and
a game initiation enabling means which enables initiation of a game when it is determined that reading of all bet areas is successful by the determination means,
the reading means terminating the reading process for the bet area when it is determined by the determination means that reading of the bet area is successful, while performing a reading process for the bet area when it is determined by the determination means that reading of the bet area is unsuccessful.

According to the configuration of (5), reading of chips is performed using an interval period from the termination of a game to the initiation of another, and therefore the period from the time betting of chips in the bet area is determined to the time the game is initiated can be shortened. As a result, reading of chips can be performed highly precisely without losing the players' interest and elation in the game and without lowering the rate of operation of the game, and undue computing ability is not required.

Thus, according to the configuration of (5), improvement in the reading rate of chips in the bet areas and faster reading are realized.

(6) A system for reading data from a plurality of chips each comprising an RFID tag, The system comprising:

a chip tray having an area which can accommodate a plurality of chips, an antenna including the area in its communication range, a database which can register the plurality of chips as data, a registration means which reads data from the chip located within the communication range at a first timing via the antenna, and registers the data in the database, an updating means which reads data from the chip located within the communication range at a second timing which occurs later than the first timing via the antenna, and updates the database based on the data read, a determination means which reads data from the chip located within the communication range at a third timing occurring later than the first timing via the antenna, and determines whether or not data of a chip other than the chip read is registered in the database, and a communication means which, when it is determined by the determination means that data of a chip other than the chip read is registered in the database, communicates individually with each chip other than the chip read.

According to the configuration of (6), registration of chips is performed at the first timing (e.g., opening of service, opening of the table), and updating of chips is performed at the second timing (e.g., payout, collection, and exchange of chips), whereby missing chips can be checked in a short period of time at the third timing (e.g., dealer change, counting of the chip tray). As a result, reading of chips can be performed highly precisely without losing the players' interest and elation in the game and without lowering the rate of operation of the game, and undue computing ability is not required.

Thus, according to the configuration of (6), improvement in the reading rate of the chip tray and faster reading are realized.

According to the present invention, individual identification (counting) of chips can be performed using the RFID technology without requiring any undue computing ability with practical precision and at a practical speed.

DESCRIPTION OF THE PREFERRED EMBODIMENTS

[First Embodiment]

Figure 1:
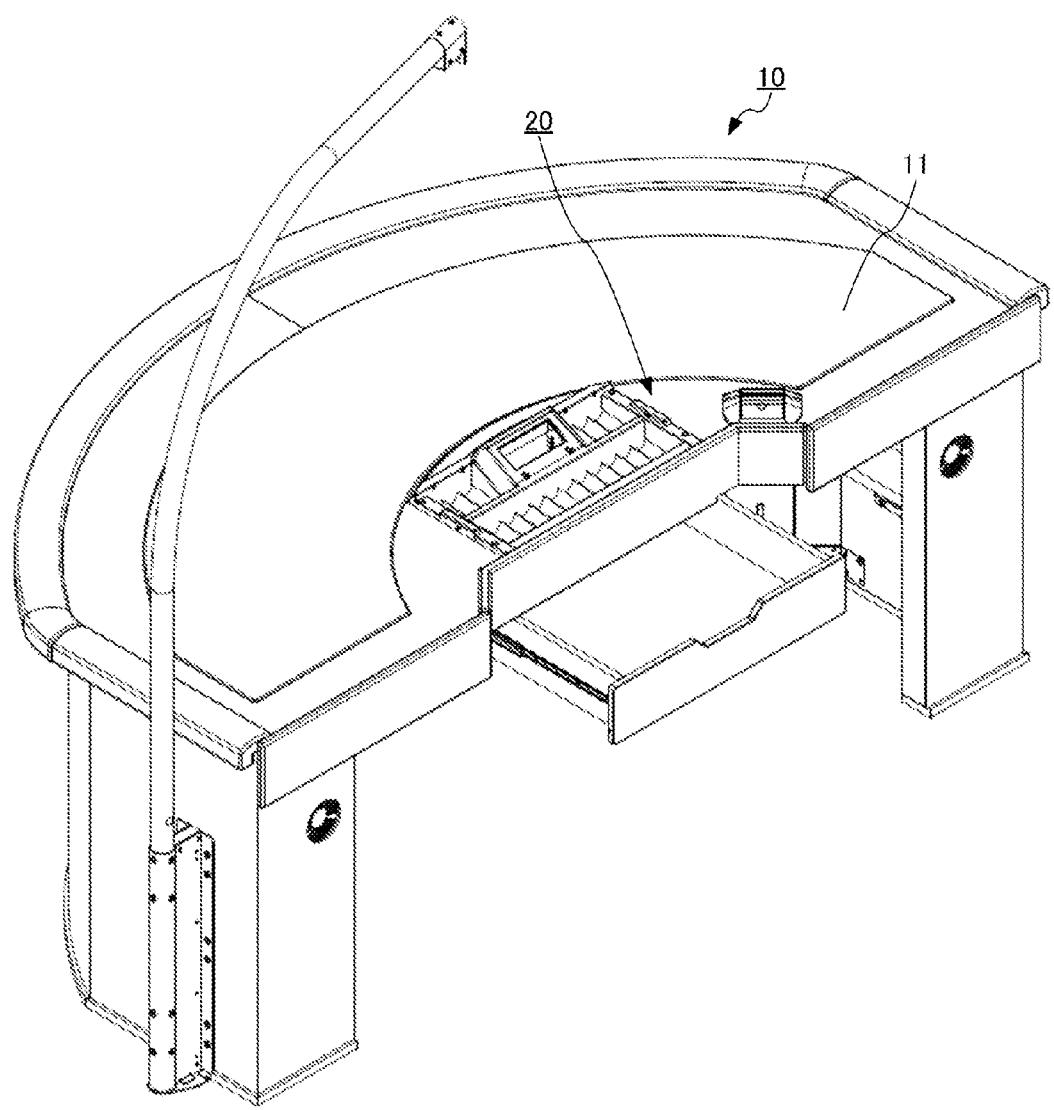
FIG. 1 is a perspective view which schematically shows the gaming machine according to a first embodiment of the present invention.

FIG. 1 is a perspective view which schematically shows a gaming machine 10 according to the first embodiment of the present invention.

The gaming machine 10 comprises a betting table 11 and a chip tray 20. The betting table 11 is a table in an approximate fan shape when seen from the top. A chip tray 20 is placed in a central portion of the approximate fan shape. Normally, a game is carried out in a state that the player is located on the outer peripheral side of the approximate fan shape of the betting table 11 when seen from the top, and the dealer is located on the front side (a central portion of the fan shape) of the chip tray 20.

Figure 2:
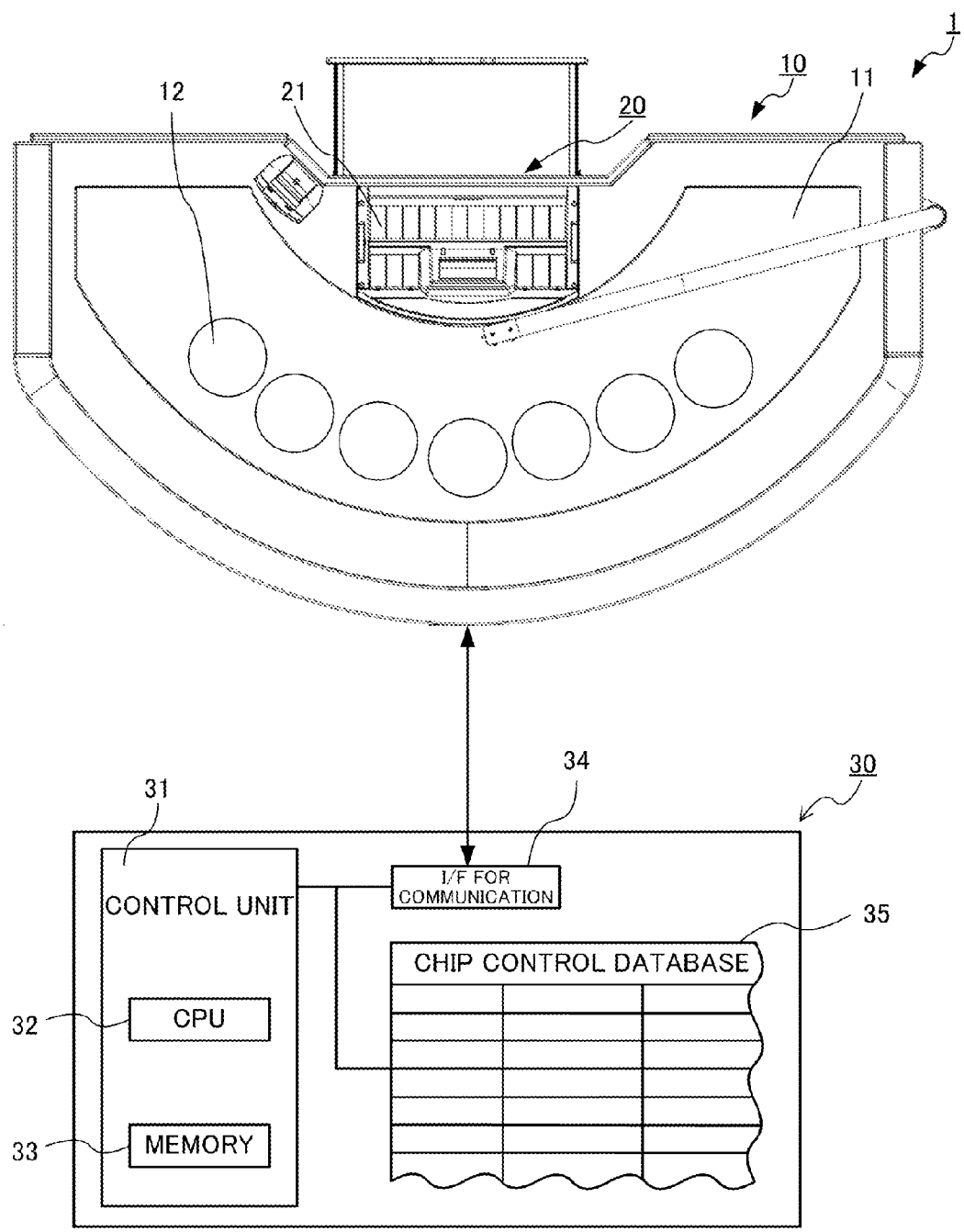
FIG. 2 is a block diagram which shows the outline of the system according to the first embodiment of the present invention.
Figure 3:
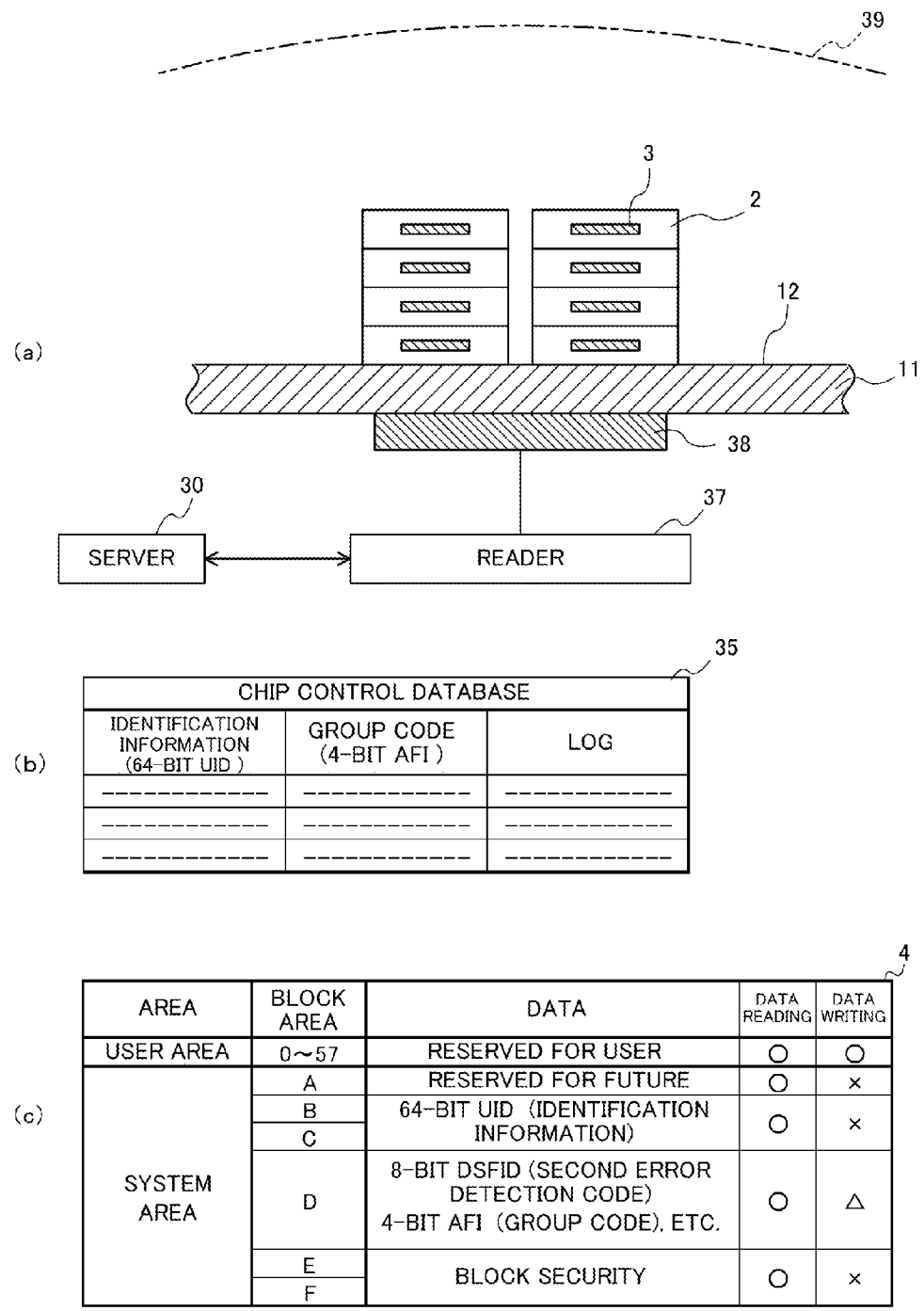
FIG. 3 (*a*) is an explanatory drawing which schematically shows a bet area on which chips are placed, while FIG. 3 (*b*) is a drawing for explaining a chip control database of a server shown in FIG. 1, while FIG. 3 (*c*) is a drawing which shows a memory structure of an RFID tag.

FIG. 2 is a block diagram which shows the outline of a system 1 according to the first embodiment of the present invention. FIG. 3 (*a*) is an explanatory drawing which schematically shows a bet area on which chips are placed.

A plurality of bet areas 12 (refer to FIG. 2) are set in the betting table 11. Each of the bet areas 12 is wide enough to allow a plurality of chips 2 to be simultaneously placed thereon. Each of the chips 2 has an RFID tag 3 integrated therein. The RFID tag 3 comprises, although not illustrated, a semiconductor chip and an antenna, and a memory 4 is mounted on the semiconductor chip. The RFID tag 3 of this embodiment is of passive type. However, the present invention is not limited to this example, and an RFID tag of active type may be used. When the RFID tag of passive type is used, the power supply system may be the electromagnetic induction system, or may be the microwave system.

An antenna 38 for communicating with the chip 2 (RFID tag 3) is placed on the rear side of each of the bet areas 12. When seen from the top, the area of the antenna 38 is smaller than that of the bet area 12, but a communication range 39 of the antenna 38 includes the entire bet area 12.

A plurality of concave portions 21 are provided on the chip tray 20, and a plurality of chips 2 can be accommodated in each of the concave portions 21. Although not illustrated, an antenna 38 is also placed on the rear side of the chip tray 20 of the chip tray 20.

The antenna 38, for example, may be placed for a chip tray 20, or may be placed for each of the concave portions 21 of the chip tray 20. The antenna 38 is connected to a reader 37, and the reader 37 is connected with a server 30. In the present invention a reader 37 may be placed for each of the antenna 38, or a plurality of antennas 38 and a single reader 37 may be connected. Moreover, in this embodiment, the reader is employed, but a reader/writer which also has a function of writing data in the RFID tag may be also used. The concept of the reader in the present invention includes a reader/writer.

The server 30 comprises a control unit 31, I/F for communication 34 and chip control database 35. The control unit 31 comprises a CPU 32 and a memory 33. The I/F for communication 34 is connected to the reader 37 provided on the gaming machine 10, and the control unit 31 communicates with the chip 2 by the reader 37 via the antenna 38.

FIG. 3 (*b*) is a drawing for explaining a chip control database of a server shown in FIG. 1.

The identification information and group code of each of the chip 2 (RFID tag 3) are stored in the chip control database 35. The gaming machine 10 or the identification information and group code of chips used in this casino may be stored in the chip control database 35 in advance, or may be read by the reader 37 to be stored in the chip control database 35 at the opening of the table (the gaming machine 10) or the casino.

In this embodiment, the identification information of each of the chips 2 is a 64-bit UID (Unique IDentifier) of the RFID tag 3. The group code of the same is a 4-bit AFI (Application Family Identifier) of the RFID tag 3. In addition, a DSFID (Data Storage Format Identifier) is not stored in the chip control database 35 of this embodiment, but the DSFID may be also stored therein.

It should be noted that the system 1 of the present invention reads data from a plurality of chips 2 by the stochastic method of the RFID technology. In the present invention, when chips are recognized by a first error detection code and a second error detection code, the intrinsic identification information of chips needs not be compared.

FIG. 3 (*c*) is a drawing which shows the memory organization of the RFID tag 3.

A memory 4 of the RFID tag 3 of this embodiment comprises a non-volatile RAM, and has a 256-byte memory region. The 256-byte memory region is blocked into sixty four 4-byte blocks. Among the sixty four blocks, fifty eight blocks are assigned to a user area (block numbers 0 to 57), while six blocks are assigned to a system area (block numbers A to F). That is, the memory 4 has the user area and system area. The user area is an area which is accessible by designating a block address. The system area is an area which is accessible only by a predetermined command.

Among the system areas A to F, the block A is an area for future use. 64-bit UIDs are stored in the block B and block C. DSFIDs, AFIs and others are stored in the block D. In this embodiment, a DSFID is a 1-byte data, and is generated from the UID by a CRC (Cyclic Redundancy Check). It should be noted that in the specification of this application the CRC denotes its function itself, and an output value by the function is referred to as a CRC code. That is, in this embodiment, the DSFID is a 1-byte CRC code. The DSFID is the second error detection code in the present invention, and is stored in an area predetermined in the memory 4. The AFI is a group code in the present invention, and is stored in an area predetermined in the memory 4. The data of the block security status is stored in the block E and block F.

Figure 4:
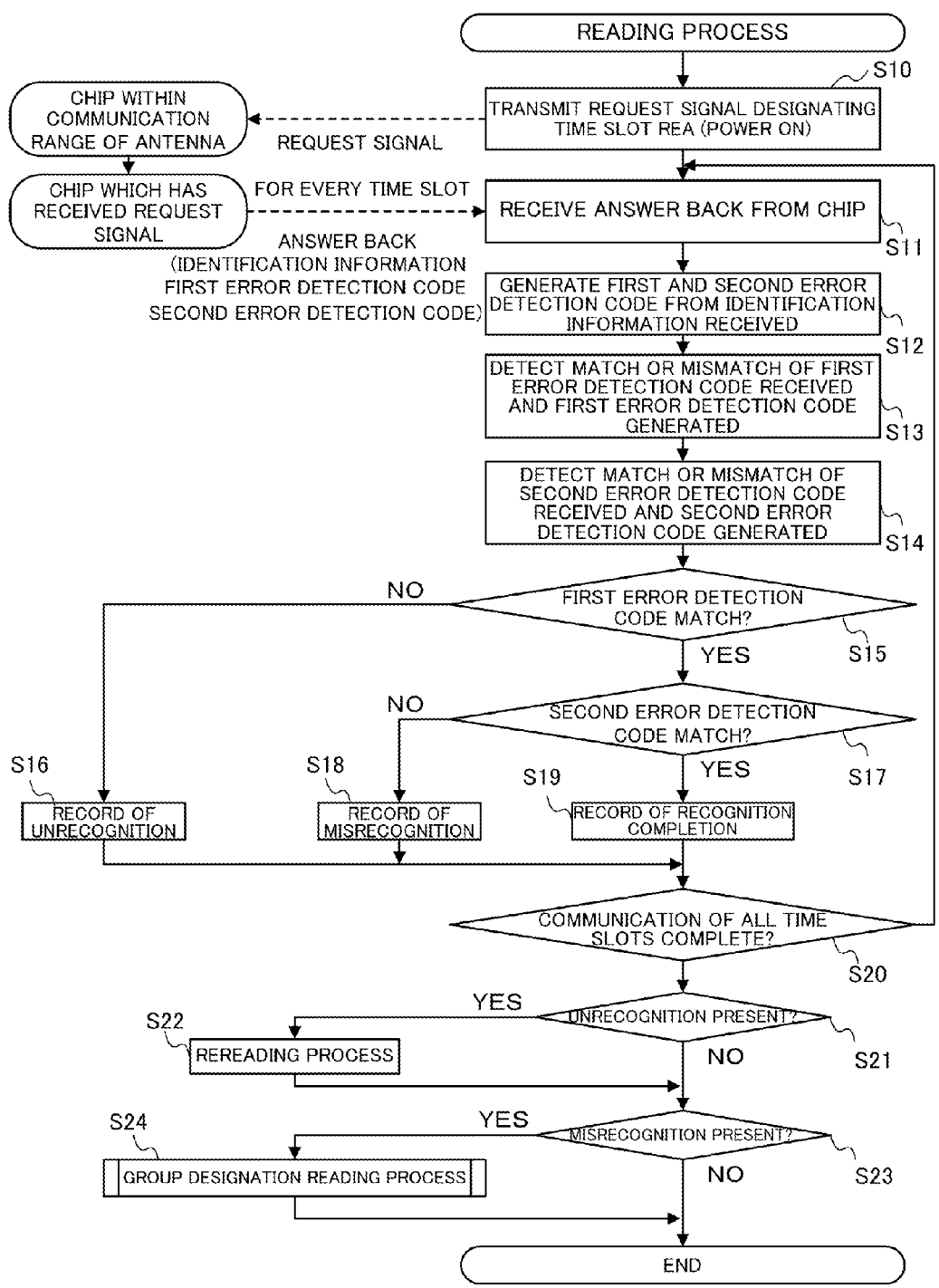
FIG. 4 is a flowchart which shows a reading process executed in a system shown in FIG. 1.

FIG. 4 is a flowchart which shows a reading process executed in a system shown in FIG. 1.

First, the control unit 31 of the server 30 transmits a request signal to the chip 2 (RFID tag 3) which is within a communication range 39 of the antenna 38 by the reader 37 via the antenna 38 (step S10). The request signal specifies one of time slot areas (e.g., the first to sixteenth lowest digits of 64-bit UIDs) predetermined in the memory 4. Therefore, the number of values that the time slot area can have is sixteen, and the number of time slots is sixteen.

In this embodiment, the time slot area is 16-bit, and specifies a part of the UID, although the present invention is not limited to this example.

In step S10, the control unit 31 functions as a request signal transmission means.

Step S10 corresponds to the request signal transmission step.

The chip 2 which has received the request signal generates a 16-bit CRC code by the CRC from the identification information. The CRC code generated here corresponds to the first error detection code in the present invention.

Second, the chip 2 which has received the request signal transmits an answer back including the identification information (64-bit UID), first error detection code (16-bit CRC code), and second error detection code (8-bit DSFID) at a timing determined for the value of each of the time slot areas.

The data length of the first error detection code and the data length of the second error detection code are shorter than the data length of the identification information. The data length of the second error detection code is shorter than the data length of the first error detection code. The first error detection code and second error detection code are generated by different methods (in this embodiment, in manners of generating different data lengths). The first error detection code is generated in an RFID tag. The second error detection code is generated in advance and is stored in the memory 4.

The control unit 31 of the server 30 receives an answer back from the chip 2 by the reader 37 via the antenna 38 (step S11).

Figure 5:
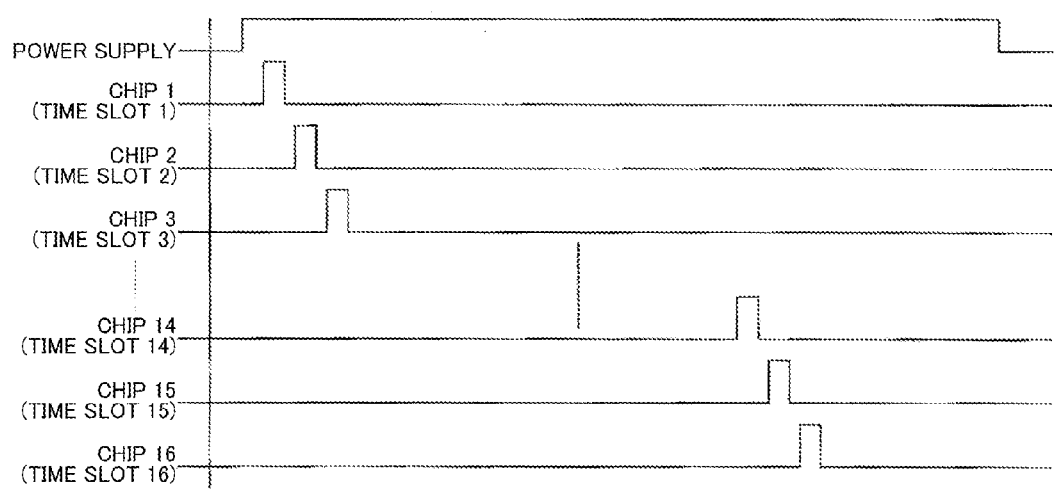
FIG. 5 is a timing chart which shows the timings of transmission and reception of signals in step S10 and step S11 of the reading process shown in FIG. 4.

FIG. 5 is a timing chart which shows the timings of transmission and reception of signals in step S10 and step S11 of the reading process shown in FIG. 4

As shown in FIG. 5, first, an answer back is received from the "chip 1" of a time slot 1 (time slot value "1"). Second, answer backs are received from the "chip 2" of a time slot 2 and the "chip 3" of a time slot 3 in the order stated. Answer backs are then received in the order of the time slots, and finally, answer backs are received the "chip 14" of a time slot 14, the "chip 15" of a time slot 15 and the "chip 16" of a time slot 16 in the order stated.

It should be noted that the answer back received in a single execution of step S11 is an answer back transmitted from the chip 2 depending on a single time slot value.

In step S11, the control unit 31 functions as an answer back receiving means.

Step S11 corresponds to an answer back receiving step.

After step S11, the control unit 31 of the server 30 generates the first error detection code (16-bit UID) and second error detection code (8-bit DSFID) from the identification information received from the chip 2 (step S12).

In step S12, the control unit 31 functions as a generation means.

Step S12 corresponds to a generation step.

After step S12, the control unit 31 of the server 30 detects match or mismatch of the first error detection code received from the chip 2 in step S11 and the first error detection code generated in step S12 (step S13). Normally, unless collision of answer backs has occurred, the values of the first error detection codes match.

After step S13, the control unit 31 of the server 30 detects match or mismatch of the second error detection code received from the chip 2 in step S11 and the second error detection code generated in step S12 (step S14). Normally, unless collision of answer backs has occurred, the values of the second error detection codes match.

In steps S13 and S14, the control unit 31 functions as an error detection means.

Steps S13 and S14 corresponds to an error detection step.

The order of steps S13 and S14 is not particularly limited, and step S13 may be performed after step S14.

After step S13 and step S14, the control unit 31 of the server 30 determines whether or not the first error detection codes have matched (step S15). Normally, if any collision of answer backs has occurred, the first error detection codes do not match, and the chip 2 cannot be recognized. This point will be now explained.

Figure 6:
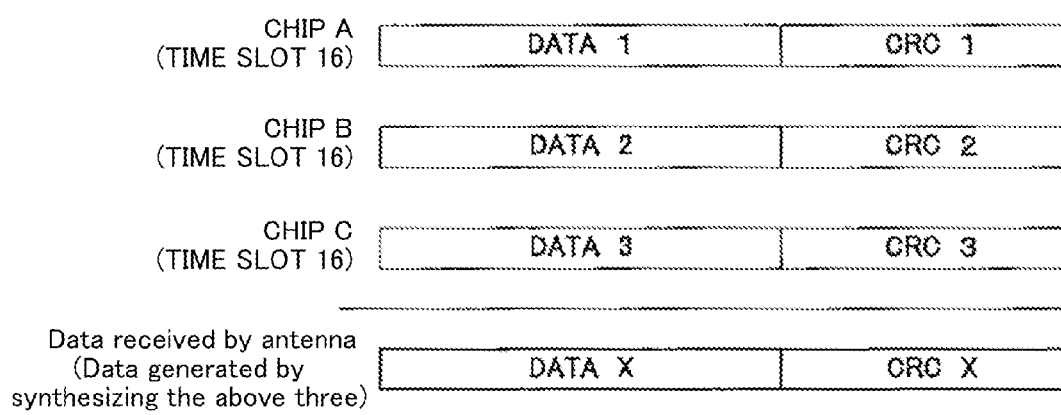
FIG. 6 is a drawing for explaining match and mismatch of a first error detection code in step S15 of the reading process shown in FIG. 4.

FIG. 6 is a drawing for explaining match and mismatch of a first error detection code in step S15 of the reading process shown in FIG. 4.

FIG. 6 shows the case where three chips A to C had transmitted answer backs at the time slot 16. The answer back of the chip A includes "DATA 1" and "CRC 1", the answer back of the chip B includes "DATA 2" and "CRC 2", and the answer back of the chip C includes "DATA 3" and "CRC 3".

It should be noted that "DATA 1", "DATA 2" and "DATA 3" include the UID as identification information and the DSFID as the second error detection code, and include the AFI as the group code in this embodiment. The "CRC 1", "CRC 2" and "CRC 3" are CRC codes as the first error detection codes. In addition, in FIG. 6 for the sake of explanation, no other data is shown.

The answer back transmitted from each of the chips A to C is synthesized when it is received via the antenna 38. Since the answer backs from the chips A to C are transmitted at the same timing, and receiving of the answer backs via the antenna 38 is an analog communication, the bits are determined by the majority of the values in the same bit positions. "DATA X" is a data obtained by synthesizing "DATA 1", "DATA 2" and "DATA 3", while "CRC X" is a data obtained by synthesizing "CRC 1", "CRC 2" and "CRC 3".

Thus, when answer backs are transmitted simultaneously from a plurality of chips 2, data values are changed, and therefore mismatch of the first error detection codes is detected in step S13. In this case, the control unit 31 determines that the first error detection codes did not match (step S15: NO), and records unrecognition as a communication outcome in the time slot in the memory 33 (step S16).

Normally, when answer backs collide, mismatch of the first error detection codes is detected in step S13. However, even when answer backs collide, the first error detection code received and the first error detection code generated may coincidentally match in some cases. The identification information which has been recognized as correct in this situation is a so-called ghost ID, and the chip 2 which has been recognized as correct is a so-called ghost chip.

When the communication of a plurality of RFID tags which have different identification information is initiated simultaneously using the same diffusion code and the same time slot, the probability that an error cannot be detected by an n-bit CRC is the probability that the n-bit CRC code generated from the identification information (DATA X) synthesized upon reception coincidentally matches with the n-bit first error detection code (CRC X) synthesized upon reception. This probability can be represented by $2^{-n}$. In this embodiment, a 16-bit CRC code is used as the first error detection code, and therefore the ghost chip occurs with the probability of $2^{-16}=1/65536$.

In step S15, when it is determined that the first error detection codes have matched, the control unit 31 of the server 30 determines whether or not the second error detection codes have matched (step S17).

In step S15 and S17, the control unit 31 functions as a determination means.

Step S15 and S17 corresponds to determination steps.

When the first error detection codes matched and the second error detection codes did not match, it means that misrecognition of the first error detection codes occurs by the collision of answer backs. In this case (step S17: NO), the control unit 31 of the server 30 records misrecognition as a communication outcome in the time slot in the memory 33 (step S18).

Meanwhile, in step S17, when it is determined that the first error detection codes have matched and the second error detection codes have matched, it is deemed that normal recognition of the chip 2 has been carried out. In this case (step S17: YES), the control unit 31 of the server 30 records the completion of recognition as a communication outcome in the time slot in the memory 33 (step S19).

After step S16, S18 or S19 has been performed, the control unit 31 of the server 30 determines whether or not the communication of all time slots (time slot 1 to 16) has terminated (step S20). When it is determined that the communication of all time slots has not terminated, the process is returned to step S11. Meanwhile, when it is determined that the communication of all time slots has terminated, the control unit 31 of the server 30 determines whether or not the memory 33 has a record of unrecognition (step S21).

In step S21, when it is determined that there is an unrecognized record, the control unit 31 executes a rereading process. In the rereading process the control unit 31 transmits a request signal which specifies a time slot area (e.g., the seventeenth to thirty second lowest 17 to 32 bits in the 64-bit UID) different from the time slot area designated in step S10, and then the processes shown at steps S11 to 19 shown in FIG. 4 is executed according to the flowchart of FIG. 4.

Figure 7:
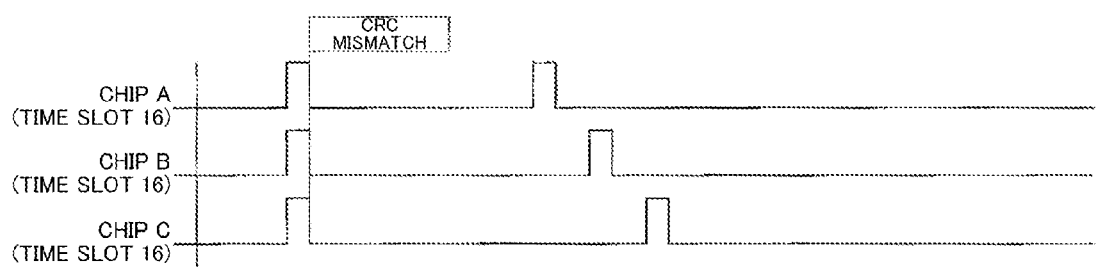
FIG. 7 is a timing chart which shows the timings of transmission and reception of signals in a rereading process in step S22 of the reading process shown in FIG. 4.

FIG. 7 is a timing chart which shows the timings of transmission and reception of signals in a rereading process in step S22 of the reading process shown in FIG. 4.

FIG. 7 shows the case where answer backs are received simultaneously from the chips A to C in the time slot 16, and consequently, mismatch of the first error detection codes (CRC code) occurs. Thus, when mismatch of the first error detection codes occurs, the control unit 31 can receive answer backs separately from the chips A to C by fixing the value of the time slot area of this time and transmitting a request signal which specifies a different time slot area. For example, when the lowest byte of UID is designated as the time slot area of this time, the lowest byte is fixed and the second lowest byte of UID is designated as the next time slot area.

It should be noted that when mismatch of the first error detection codes is detected again, the request signal is transmitted by changing the designation of the time slot area sequentially until no more mismatch of the first error detection codes occurs. Accordingly, the unrecognized chip 2 is recognized. In addition, in the process of step S22, the control unit 31 may record misrecognition in the memory 4 in some cases.

In step S21, when it is determined that the memory 4 does not have any record of unrecognition, or when the process of in step S22 is executed, the control unit 31 determines whether or not the memory 4 has a record of misrecognition (step S23). When it is determined that there is a record of misrecognition, the control unit 31 a group designation reading process is performed (step S24). The group designation reading process will be described later with reference to FIG. 8. In step S23, when it is determined that there is no a record of misrecognition, or in step S24, when the group designation reading process is executed, this process is terminated.

Figure 8:
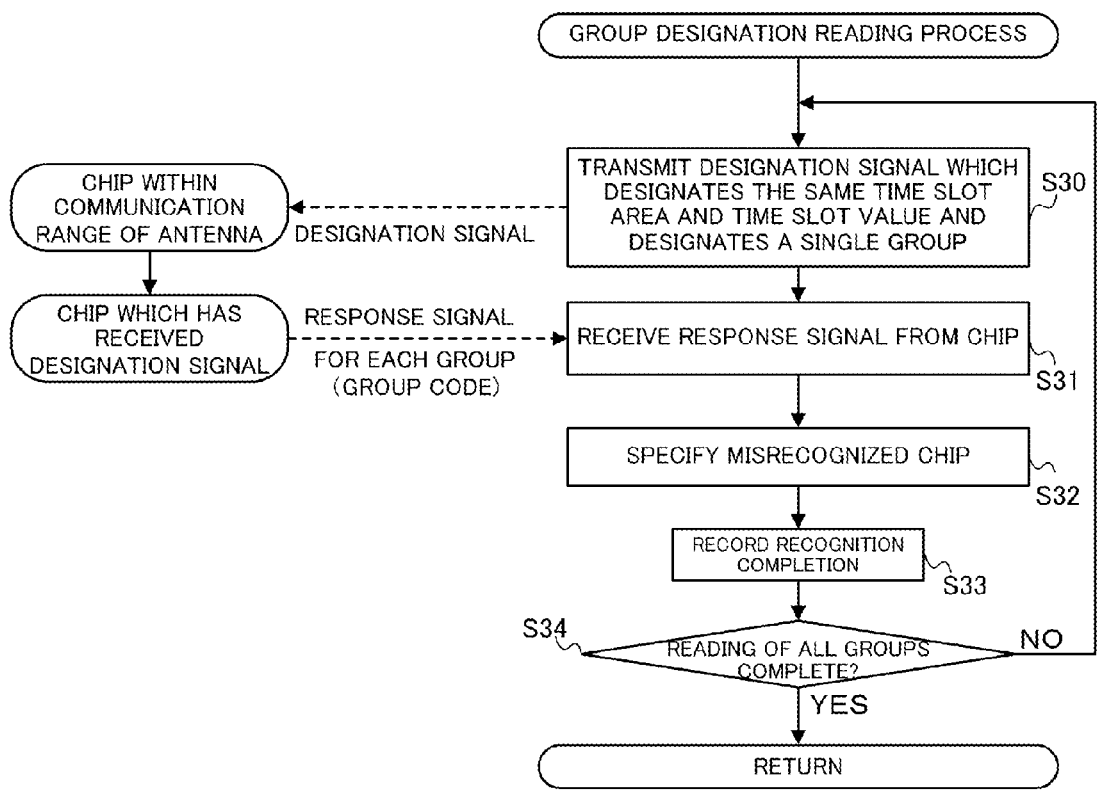
FIG. 8 is a flowchart which shows a group designation reading process in step S24 of the reading process shown in FIG. 4.

FIG. 8 is a flowchart which shows a group designation reading process in step S24 of the reading process shown in FIG. 4.

The control unit 31 transmits a designation signal which specifies the same time slot area and time slot value as those when misrecognition of the first error detection codes occurs and specifies a single group (step S30).

The designation signal includes a group code, and designation of groups is performed by the group code. The number of groups is a number ($2^n$) which can be taken on by the group code. In this embodiment, the group code is 4 bit, and the number of groups is $2^4=16$. It should be noted that the present invention is not limited to this example, and it can be any mode as long as the number of the group codes and the number of the groups used in the system are the same.

In step S30, the control unit 31 functions as a designation signal transmission means.

Step S30 corresponds to a designation signal transmission step.

The chip 2 which has received the designation signal transmits a response signal including the group code, identification information and first error detection code.

The data length of the group code is shorter than the identification information, first error detection code and second error detection code. The group code is assigned to each of the chips 2 in advance, and stored in the memory 4. It should be noted that in this embodiment, the case where the response signal includes the group code, identification information and first error detection code is explained, but the present invention is not limited to this example, and that the response signal may include at least a group code, and may include a group code, identification information, first error detection code and second error detection code.

The control unit 31 of the server 30 receives a response signal from the chip 2 by the reader 37 via the antenna 38 (step S31).

In step S31, the control unit 31 functions as a response signal receiving means.

Step S31 corresponds to a response signal receiving step.

Second, the control unit 31 performs a process for specifying a misrecognized chip (step S32).

In this process, the first error detection code is generated from the identification information included in the designation signal received, and recognition of the chip is performed by comparing the generated first error detection code with the first error detection code included in the designation signal received. In this process, comparison of the first error detection codes is performed in a state that the group codes are specified, and therefore collision of the response signals is unlikely to occur. However, when the response signals collide, the chip cannot be identified as in the case of the answer backs mentioned above. To this end, in step S32, when the first error detection codes do not match, a different time slot area is further designated and a designation signal is transmitted. It should be noted that the process for specifying of the misrecognized chip here may be omitted, and it may be determined that the misrecognized chip is specified by the reception of the designation signal.

Second, the control unit 31 records that recognition about the group has been completed in the memory 33, and further when the chip 2 could be recognized, (step S33). The control unit 31 then determines whether or not that has been completed reading of all groups based on the record in the memory 33 (step S34). When reading of all groups has not been completed, the process is returned to step S30, and the processes of steps S30 to S34 are repeated until reading of all groups is completed. Meanwhile, when reading of all groups has been completed, this subroutine is terminated.

As described above, the first embodiment is the system 1 which reads data from a plurality of chips 2 comprising an RFID tag. In the system 1, the RFID tag 3 provided in each of the plurality of chips 2 comprises the memory 4, and the memory 4 comprises a storage area which stores intrinsic identification information (e.g., UID) of the chip 2, and a storage area which stores the second error detection code (e.g., DSFID) generated from the identification information. The system 1 has the following configuration:

the antenna 38, a request signal transmission means which transmits a request signal which designates as a time slot area a portion (4 bits) of the identification information of the memory 4 for a plurality of chips 2 located within a communication range 39 of the antenna 38 (step S10), an answer back receiving means for receiving an answer back transmitted at a timing determined for each a time slot value of the memory 4 provided in the chip 2 from the chip 2 which has received the request signal, the answer back including identification information of the chip 2, a second error detection code, a first error detection code generated from the identification information (e.g., CRC code), the data lengths of the first error detection code and the second error detection code being shorter than that of the identification information, and the data length of the second error detection code being shorter than that of the first error detection code, (step S11), a generation means which generates the first error detection code and the second error detection code from the identification information received by the answer back receiving means (step S12), a first error detection means which determines whether or not the first error detection code generated by the generation means and the first error detection code received by the answer back receiving means match, and detects an error when the codes do not match (step S13), a second error detection means which determines whether or not the second error detection code generated by the generation means and the second error detection code match received by the answer back receiving means, and detects an error when the codes do not match (step S14), a first determination means which determines that that the chip 2 cannot be recognized due to the collision of answer backs when an error is detected by either the first error detection code or the second error detection code (step S15 to S16), and a second determination means which, when no error is detected by either the first error detection code or the second error detection code, and an error is detected by the other, determines that misrecognition occurs of the chip 2 due to the collision of answer backs (step S17 to S18).

According to the system 1 of this embodiment, when an error is detected by either the first error detection code or the second error detection code, it is determined that the chip 2 could not be recognized due to the collision of answer backs, while when no error is detected by one of the first error detection code and the second error detection code and no error is detected by the other, it is determined that misrecognition of the chip 2 has occurred due to the collision of answer backs. Therefore, miscounting of the chip 2 can be detected, whereby employing the wrong counting value as a counting outcome can be prevented.

In addition, the system 1 of this embodiment is configured as follows:

the memory 4 comprises a group code storage area which stores the group code (e.g., AFI) of the chip 2, the data length of the group code is shorter than that of the second error detection code, the plurality of chips 2 is grouped into the number (e.g., 16) of groups depending on a value (e.g., 1 to 15) which can be taken on by the group code, the group code is assigned to each of the chip 2 depending on the group of the chip 2, the system 1 has the following configuration:

a designation signal transmission means which, when the second determination means determines that misrecognition of the chip 2 has occurred, designates the same time slot area the time slot area as designated for the chip 2, and sequentially transmits a designation signal for designating groups to each group (step S30), and a response signal receiving means which receives a response signal from the chip of the group designated by the designation signal (step S31).

According to the system 1 of this embodiment, when misrecognition of the chip 2 occurs, the chip which has been recognized as ghost chip can be identified highly precisely. Therefore, counting with a higher precision can be realized.

[Second Embodiment]

Figure 9:
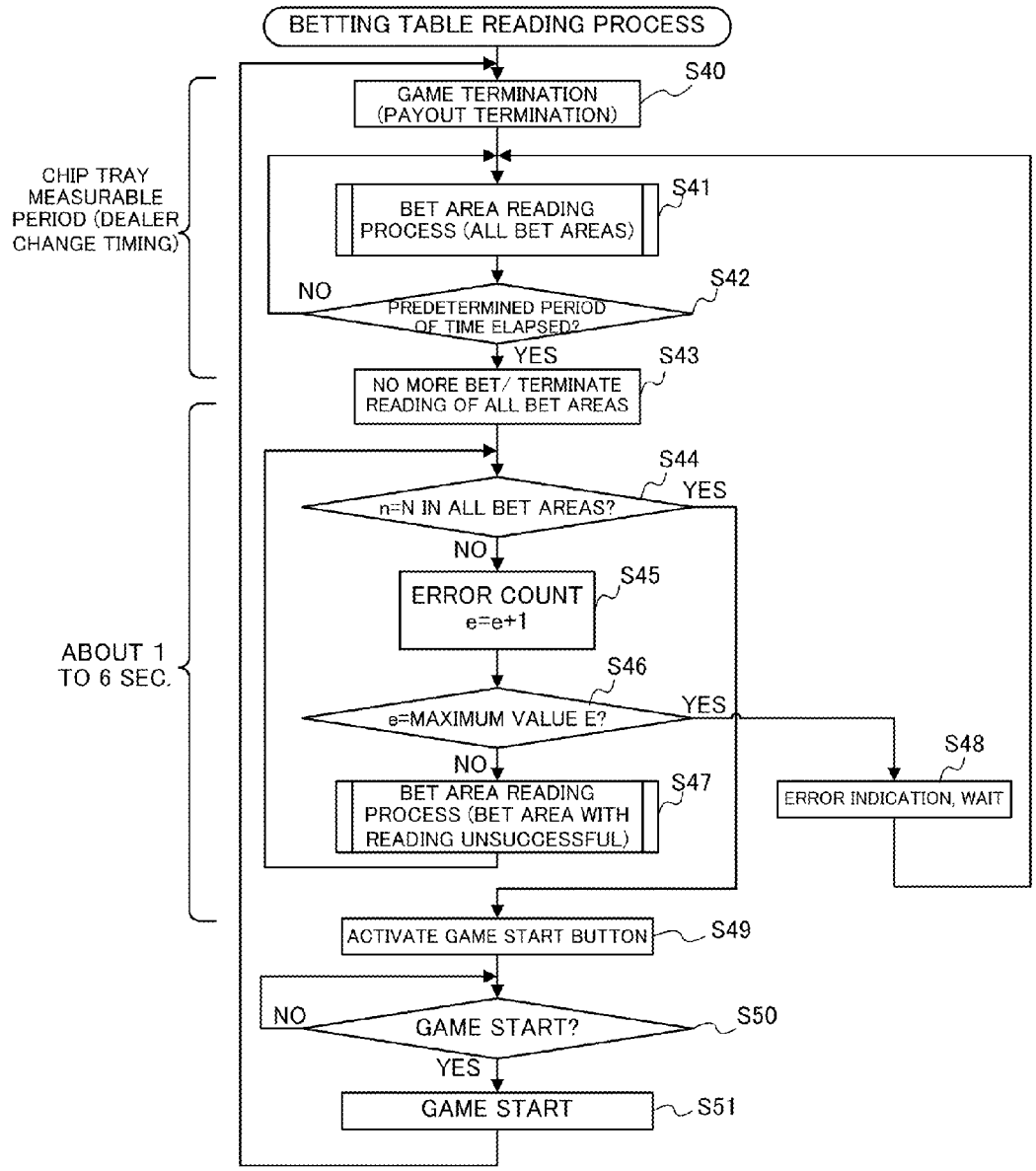
FIG. 9 is a flowchart which shows a betting table reading process according to a second embodiment of the present invention.

FIG. 9 is a flowchart which shows a betting table reading process according to a second embodiment of the present invention.

The control unit 31 of the server 30 performs a process for terminating a game (step S40). In the process for terminating the game, payout of chips is terminated, and a game outcome is determined. For example, the game outcome may be determined when chips are paid out (paid off), and an instruction to terminate the game is input by the dealer (or the player) through an input device installed on a betting table 11. When this process is terminated, a single game is terminated, and the period until the next game becomes an interval period.

Second, the control unit 31 of the server 30 performs a bet area reading process for all bet areas 12 (step S41). The bet area reading process will be now described.

Figure 10:
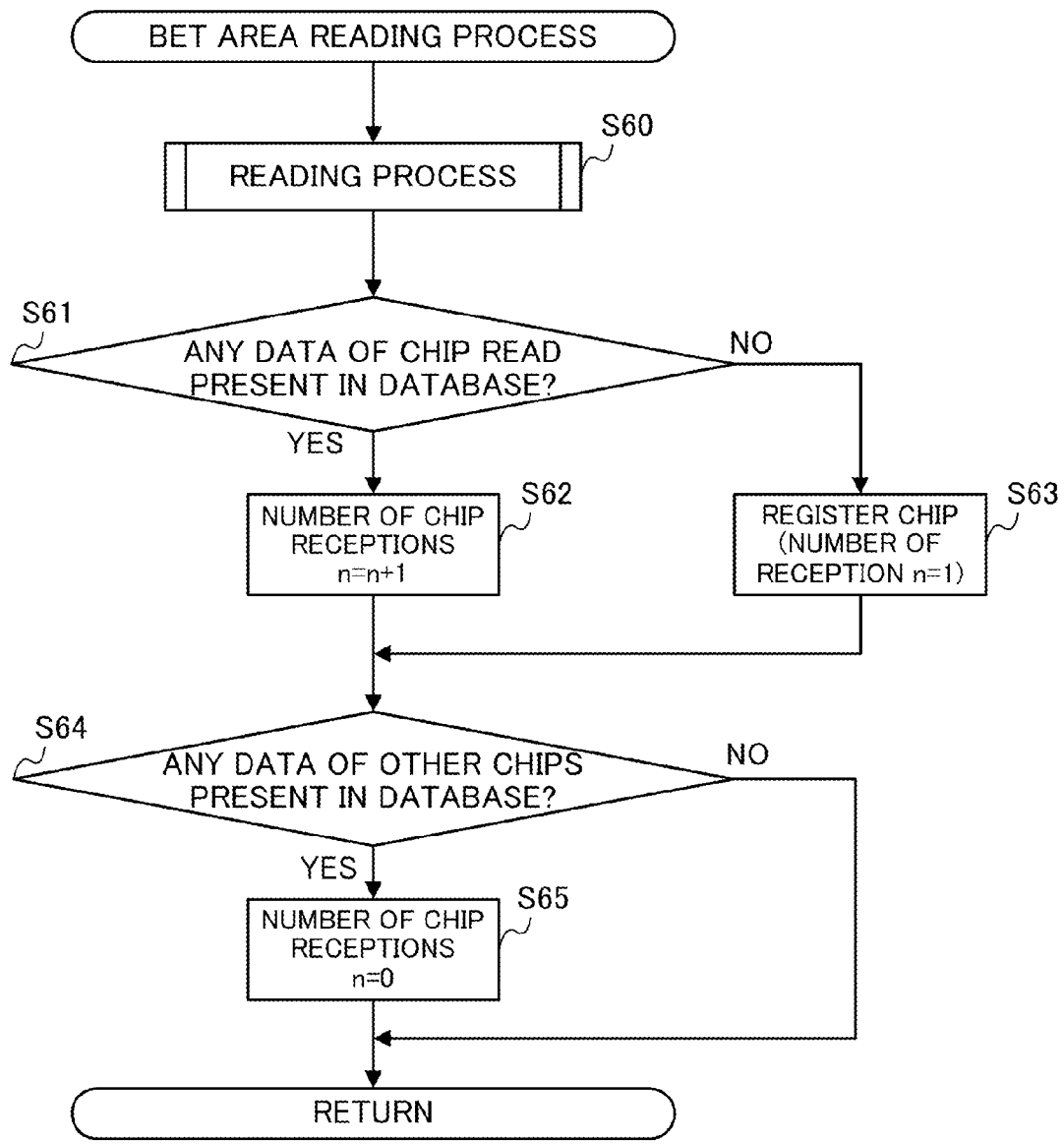
FIG. 10 is a flowchart which shows a bet area reading process executed in step S41 and step S47 of the betting table reading process shown in FIG. 9.

FIG. 10 is a flowchart which shows the bet area reading process executed in step S41 (and step S47 described later) of the betting table reading process shown in FIG. 9.

In the bet area reading process, the control unit 31 performs a reading process for each bet area 12 (step S60). An example of this reading process is the reading process shown in FIG. 4. In the present invention, the reading process herein is not limited to the reading process shown in FIG. 4, and it can be any process which can read a plurality of chips 2 in the bet area 12.

Second, the control unit 31 of the server 30 determines whether or not the data of the chip 2 read is recorded in a chip control database 35 in association with the bet area 12 on which the chip 2 is mounted (step S61).

The bet area reading process of FIG. 10 is step S41 in of the betting table reading process FIG. 9, and is repeatedly executed until it is determined that a predetermined period of time has elapsed in step S42 after the termination of the game of step S40. During the process, the process of step S61 is also repeatedly executed. In the first execution of step S61 the data of the chip 2 read is not recorded in the chip control database 35 in association with the bet area 12 in which the chip 2 is placed. The second and later executions of step S61 the data of the chip 2 read is recorded in a chip control database 35 in association with the bet area 12 on which the chip 2 is mounted in some cases, while this is not the case in the other instances.

The absence of a record of the data of the chip 2 read in the chip control database 35 means that movement of the chip 2 has not been carried out between the previous reading process and this reading process. The absence of a record of the data of the chip 2 read in the chip control database 35 means that a new chip 2 is placed in the bet area 12 between the previous reading process and this reading process.

In step S61, when it is determined that the data of the chip 2 read is not recorded in the chip control database 35, the control unit 31 registers the chip 2 read in the chip control database 35 (step S63). Specifically, the control unit 31 records the data of the chip 2 read in association with the bet area 12 in which the chip 2 is placed, and sets the number of receptions n to n=1.

In step S61, when it is determined that the data of the chip 2 read is not recorded in the chip control database 35, the control unit 31 sets the number of receptions n to n=n+1 (step S62).

When the processes of step S62 or S63 are executed, the control unit 31 determines whether or not data other than the data of the chip 2 read is included in the data recorded in association with the bet area 12 in the chip control database 35 (step S64).

The presence of data other than the data of the chip 2 read included in the data recorded in association with the bet area 12 means the presence of a chip 2 which has been removed from the bet area 12 between the previous reading process and this reading process.

In step S64, when it is determined that there is data other than the data of the chip 2 read, the control unit 31 sets the number of receptions n to n=0 (step S65).

When the process of step S65 is executed, or in step S64, when it is determined that there is data other than the data of the chip 2 read in the chip control database 35, this subroutine is terminated, and the process is returned to FIG. 9. Accordingly, step S41 of FIG. 9 is terminated.

Second, the control unit 31 determines whether or not a predetermined period has elapsed after termination of the previous game (step S40) (step S42). Herein, the predetermined period is a period of time from the termination of the game and determination of the bet. When it is determined that the predetermined period of time has not elapsed, the control unit 31 returns the process to step S41. As a result, the control unit 31 continuously performs the reading process of data from each of the chips 2 placed in each bet area 12 by each 38 between the termination of the game (step S41) and the determination of bet (step S43).

When the processes of step S41 and S42 are repeatedly executed, the control unit 31 functions as a reading means. In addition, the period of steps S40 to S43 is a measurable period of the chip tray 20 (that is, dealer change timing).

It should be noted that in this embodiment, the case where the reading process is performed from the termination of the game to the determination of bet will be described, but the present invention is not limited to this example. The reading process can be performed in a given period from the termination of the game to the initiation of the game.

Moreover, in this embodiment, the case where the reading process is executed continuously will be described, but the present invention is not limited to this example. For example, the reading process may be performed intermittently (e.g., at a predetermined cycle).

In step S42, when it is determined that the predetermined period of time has elapsed, the control unit 31 performs the setting "No More BET", and terminates reading of all bet areas 12 (step S43).

Second, the control unit 31 determines whether or not the number of receptions n of the chips 2 in all bet areas 12 has reaches n=N based on the data of the chip control database 35 (step S44). N is a predetermined value, is a value lower than the number of times of the reading processes performed from the termination of the game to the initiation of the game, for example, 2 to 3 times.

In step S44, the control unit 31 functions a determination means.

When the number of receptions n of the chips 2 in all bet areas 12 has reached n=N, the same data are read from the chip 2 placed in the bet area 12 for a predetermined consecutive number of times (N times), and therefore the reading of the bet area 12 is successful.

In that case (step S44: YES), the control unit 31 activates a "GAME START" button (not illustrated) provided on the betting table 11 (step S49). The process of activation is a process for enabling accepting the operation of the "GAME START" button. Before the activation is performed, the control unit 31 does not performs the process for initiating a game even if the button is operated, while after the activation is performed, the control unit 31 executes the process for initiating a game by the operation of the button.

In step S49, the control unit 31 functions as a game initiation enabling means.

After step S49, the control unit 31 determines whether or not to initiate a game (step S50). The control unit 31 determines, when the "GAME START" button is operated, to start a game (step S50: YES), and performs a process for initiating a game (step S51). Thereafter, when the game is terminated, the process is returned to step S40.

Meanwhile, in step S50, when the "GAME START" button is not operated, the control unit 31 returns the process to step S50, and repeats the process until the "GAME START" button is operated.

When the number of receptions n of the chips 2 in all bet areas 12 has not reached n=N, the same data are read from the chip 2 placed in the bet area 12 for a predetermined consecutive number of times (N times), and therefore the reading of the bet area 12 is unsuccessful.

In that case (step S44: NO), the control unit 31 performs an error count, and sets a number e of errors stored in the memory 33 to e=e+1 (step S45).

It should be noted that the initial value of e is 0.

Second, the control unit 31 determines whether or not the number e of errors of any of the bet areas 12 has reached a maximum value E (step S46). The maximum value E is a predetermined value. The maximum value E may be greater than, smaller than, or equal to the predetermined number N mentioned above.

In step S46, when it is determined that the number e of errors is the maximum value E, error indication and WAIT (standby) are performed (step S48), and the process is then returned to step S41. In step S48, examples of the cases where error indication and WAIT are performed include the case where the player or dealer has moved the chip 2, unstable communication or unavailable communication due to the deterioration of the chip 2, failure of facilities including the antenna 38, radio interference, among others.

Meanwhile, in step S46, when it is determined that the number e of errors is not the maximum value E, the control unit 31 performs a bet area reading process (FIG. 10) on the bet area 12 whose reading has failed (step S47), and then returns the process to step S44.

Thus, in this embodiment, when it is determined n=N (reading successful) in step S44, the reading process of the bet area 12 is terminated, while when it is determined n≠N (reading failed) in step S44, the reading process in step S47 is performed.

As described above, according to the system 1 of the second embodiment, reading of the chip 2 is performed by using the period from the termination of the game to the initiation of the game interval, and therefore the period from the determination of betting of the chip 2 in the bet area 12 to the initiation of the game can be shortened.

Assuming that the chip 2 is determined at "No More BET" and then reading of the chip 2 is started, it takes about 30 seconds from the determination of the chip 2 to the initiation of the game, which adversely affects the smooth running of the game. Accordingly, in the second embodiment reading is initiated from the termination of the previous game so that the period from the determination of the chip 2 to the initiation of the game is shortened.

As a result, reading of the chip 2 can be performed highly precisely without losing the players' interest and elation in the game and without lowering the rate of operation of the game. In addition, undue computing ability is not required at that time.

[Third Embodiment]

Figure 11:
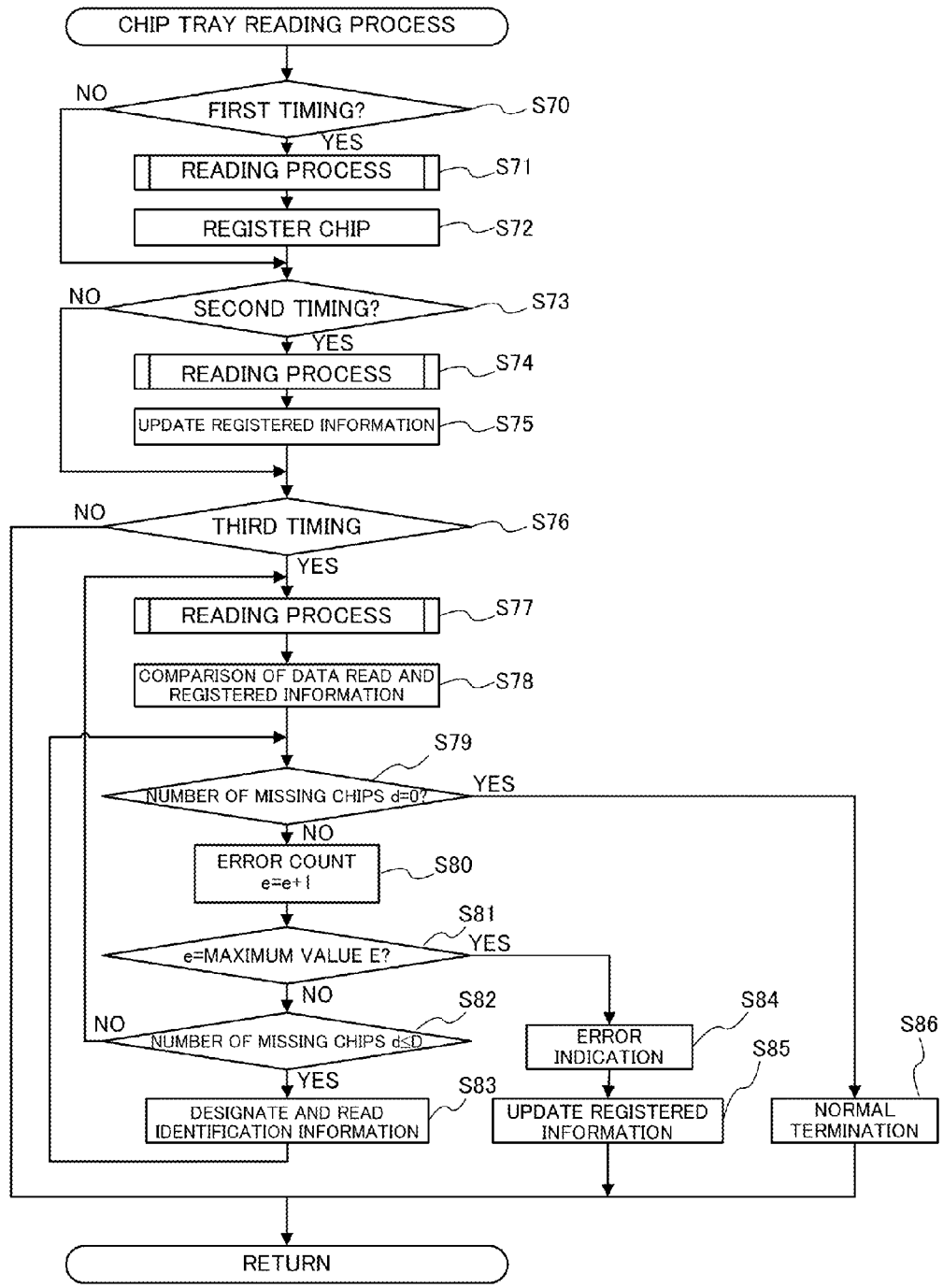
FIG. 11 is a flowchart which shows a chip tray reading process according to a third embodiment of the present invention.

FIG. 11 is a flowchart which shows a chip tray reading process according to a third embodiment of the present invention.

The process shown by the flowchart of FIG. 11 is a process which is repeatedly invoked and executed at a predetermined timing when the process shown in FIG. 9 is being executed.

The control unit 31 determines whether or not it is a first timing (step S70). The first timing is earlier than a second timing and third timing. The first timing may be a given timing when the chip 2 is not registered as the chip 2 in the chip tray 20 in the chip control database 35, and may be, for example, opening of service or the table.

When it is determined that it is the first timing (step S70: YES), the control unit 31 performs a reading process (step S71). Examples of this reading process include the reading process shown in FIG. 4. in the present invention, the reading process herein is not limited to the reading process shown in FIG. 4, and may be any process as long as it can read a plurality of chips 2 in the chip tray 20.

Next, the control unit 31 registers the chip 2 read as the chip 2 in the chip tray 20 in the chip control database 35 based on the data read from the chip 2 in the chip tray 20 (step S72).

In steps S71 and S72, the control unit 31 functions as a registration means.

In step S70, when it is determined that it is not the first timing, or when the process of step S72 is executed, the control unit 31 determines whether or not it is the second timing (step S73). The second timing is not particularly limited as long as it is after the first timing. For example, it may be such timing as pay out, collection and exchange of the chip 2.

When it is determined that it is the second timing (step S73: YES), the control unit 31 performs a reading process (step S74). The reading process herein is the same process as step S71.

After step S74, the control unit 31 performs a process for updating the registered information (step S75). In step S75, the control unit 31 performs the following processes (i) to (iii) based on the registered information of the chip 2 in the chip tray 20 in the chip control database 35 and the data of the chip 2 read from the chip tray 20 in step S74.

(i) When the data of the chip 2 read from the chip tray 20 matches the registered information of the chip 2, the registered information is maintained since the chip 2 read is already registered.

(ii) When the data of the chip 2 read from the chip tray 20 of the chip 2 does not match the registered information, the data is registered in the chip control database 35 since the chip 2 read has not yet been registered.

The registration process herein is similar to step S72.

(iii) When data other than the data of the chip 2 read from the chip tray 20 is included in the registered information of the chip 2, a chip 2 other than the chip 2 read is registered, and therefore the data other than the data of the chip 2 read is deleted from the chip control database 35.

By performing the processes (i) to (iii) mentioned above, the data of the chip 2 can be updated.

In step S74 and S75, the control unit 31 functions as a updating means.

In step S73, when it is determined that it is not the second timing, or when the process of step S75 is executed, the control unit 31 determine whether or not it is the third timing (step S76). The third timing is not particularly limited as long as it is after the first timing. For example, it may be a timing such as when the dealer is changed and counting of the chip tray 20. When it is determined that it is not the third timing (step S76: NO), this subroutine is terminated.

Meanwhile, when it is determined that it is the third timing (step S76: YES), the control unit 31 performs a reading process (step S77). The reading process herein is the same process as step S71.

After step S77, the control unit 31 compares the registered information of the chip 2 in the chip tray 20 in the chip control database 35 with the data of the chip 2 read from the chip tray 20 in step S77 (step S78).

The comparison in step S78 results in the following cases (I) to (III).

(I) the data of the chip 2 read from the chip tray 20 matches the registered information of the chip 2, (II) the data of the chip 2 read from the chip tray 20 of the chip 2 does not match the registered information, and (III) data other than the data of the chip 2 read from the chip tray 20 is included in the registered information of the chip 2.

In case (III), the chip 2 is missing.

In step S77 and S78, the control unit 31 functions as a determination means.

After step S78, the control unit 31 determines whether or not the number d of missing chips is 0 (step S79). When the number d of missing chips is 0, the control unit 31 determines that the reading has been normally performed, and normally terminates the reading of the chip tray 20 (step S86). Thereafter, this subroutine is terminated.

The case where the number d of missing chips is 0 falls under the case (I) described above. However, the present invention is not limited to this example, and the cases (I) and (II) mentioned above may be included in the case where the number of missing chips is 0.

When the number d of missing chips is not 0, the control unit 31 determines that the reading was not performed normally, performs an error count, and sets a number e of errors stored in the memory 33 to e=e+1 (step S80).

It should be noted that the initial value of e is 0.

The case where the number d of missing chips is not 0, falls under the cases (II) and (III) mentioned above. However, the present invention is not limited to this example, and the case where the number d of missing chips is not 0 may be only the case (III) mentioned above.

After step S80, the control unit 31 determines whether or not the number e of errors has reached a maximum value E (step S81). The maximum value E is a predetermined value. The maximum value E in step S81 may be the same as or different from the maximum value in step S46.

In step S81, when it is determined that the number e of errors is the maximum value E, the control unit 31 performs error indication (step S84), and performs a process for updating the registered information of the chip control database 35 based on read in step S77 (step S85). The updating process herein is the same as that in step S75. After step S85, this subroutine is terminated.

Meanwhile, in step S81, when it is determined that the number e of errors is not the maximum value E, the control unit 31 determines whether or not the number d of missing chips is equal to or lower than a reference value D (step S82). The reference value D is a predetermined value, and is not particularly limited.

In step S82, when it is determined that the number d of missing chips is not equal to or lower than the reference value D, the control unit 31 returns the process to step S77, and again performs a reading process.

Meanwhile, in step S82, when it is determined that the number d of missing chips is equal to or lower than a reference value D, the control unit 31 specifies the identification information of the missing chips based on the data of missing chips, of the data stored in the chip control database 35 and performs reading of the chip 2 (step S83). The identification information used herein is for example, UID, and in step S83, when the missing chips are specified by the reading using the identification information, the number of the missing chips is decreased.

Thus, by performing reading with the identification information (e.g., UID) specified, reading time can be shortened. In step S83, the control unit 31 functions as a communication means. After step S83, the process is returned to step S79.

Thus, in this embodiment, when the number of missing chips is higher than a predetermined reference value, a reading process is performed on the entire chip tray 20, while when the number of missing chips is equal to or lower than the reference value, reading is performed with the identification information of the chip 2 designated.

According to the system 1 of the third embodiment, registration of the chips 2 in the chip tray 20 is performed at the first timing, and updating of the chips 2 is performed at the second timing, and therefore the missing chips 2 at the third timing can be checked in a short period of time. As a result, reading of chips can be performed highly precisely without losing players' interest and elation in the game and without lowering the rate of operation of the game, and undue computing ability is not required. Accordingly, the system 1 of the third embodiment is capable of finding frauds and mistakes by the dealer, and helps to find failures of the chips 2 and instruments.

Although the embodiments of the present invention have been described, these embodiments merely illustrate concrete examples, not restrict the present invention. The concrete structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there have been described processes to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

[Description Of The Numerals]
1 (Chip reading) system
2 Chip
3 RFID tag
4 Memory (of RFID)
10 Gaming machine
11 Betting table
12 Bet area
20 Chip tray
21 Concave portion
30 Server
31 Control unit
32 CPU
33 Memory (of server)
34 Communication I/F
35 Chip control database
37 Reader
38 Antenna
39 Communication range (of antenna)

What is claimed is:

1. A system for reading data from a plurality of chips each comprising an RFID tag,
the RFID tag provided in each of the plurality of chips comprising a memory,
the memory storing an intrinsic identification information of at least the chip,
the system comprising:
an antenna,
a request signal transmission unit which transmits a request signal to a plurality of chips located in a communication range of the antenna by the antenna, the request signal designating at least 1 bit of the memory as a time slot area,
an answer back receiving unit which receives an answer back at a predetermined timing from a chip from which the request signal is received via the antenna transmitted for each value stored in the time slot area of the memory provided in the chip, the answer back including the identification information of the chip and a plurality of error detection codes generated from the identification information, the plurality of error detection codes being generated in the RFID tag by methods different from that of each other or generated in advance and stored in the memory,
a generation unit which produces the plurality of error detection codes from the identification information received by the answer back receiving means,
an error detection unit which detects match or mismatch between the plurality of error detection codes generated by the generation unit and the plurality of error detection codes received by the answer back receiving means, and
a determination unit which determines when, among a plurality of pairs of error detection codes, match of a pair of error detection codes is detected and mismatch of another pair of error detection codes is detected by the error detection means, that match of the pair of error detection codes of the chip is misrecognition resulting from collision of the answer back.

2. The system according to claim 1, wherein
the plurality of chips are grouped into a plurality of groups,
the memory stores group codes which indicate the groups of the chips,
the system comprises:
a designation signal transmission unit which, when match of the pair of error detection codes of the chips is determined as misrecognition by the determination means, designates a time slot value depending on the time slot area designated for the chip and a timing of receiving an answer back from the chip, and sequentially transmits a designation signal which designates a single group to each of the groups by the antenna, and
a response signal receiving unit which receives a response signal from the chip of the group designated by the designation signal via the antenna.

3. A method for reading data from a plurality of chips comprising an RFID tag,
the RFID tag provided in each of the plurality of chips comprising a memory,
the memory storing an intrinsic identification information of at least the chip,
the method comprising:
a request signal transmission step for transmitting a request signal to a plurality of chips located within a communication range of an antenna by an antenna, the request signal designating at least 1 bit of the memory as a time slot area,
an answer back receiving step for receiving an answer back at a predetermined timing from a chip from which the request signal is received via the antenna transmitted for each value stored in the time slot area of the memory provided in the chip, the answer back including the identification information of the chip and a plurality of error detection codes generated from the identification information, the plurality of error detection codes being generated in the RFID tag by methods different from that of each other or generated in advance and stored in the memory,
a generation step for generating the plurality of error detection codes from the identification information received in the answer back receiving step,
an error detection step for detecting match or mismatch of the plurality of error detection codes generated in the generation step and the plurality of error detection codes received in the answer back receiving step, a determination step for determining, when, among a plurality of pairs of the error detection codes, match of a pair of error detection codes is detected and mismatch of another pair of error detection codes is detected in the error detection step, match of the pair of error detection codes of the chips is misrecognition resulting from collision of the answer backs.

4. The method according to claim 3, wherein
the plurality of chips are grouped into a plurality of groups,
the memory stores group codes which indicate the groups of the chips,
the method comprising:
a designation signal transmission step for designating, when it is determined in the determination step that match of the pair of error detection codes of the chips is misrecognition, a time slot value depending on the time slot area designated for the chip and a timing of receiving an answer back from the chip, and sequentially transmitting a designation signal which specifies a single group to each of the groups by the antenna, and
a response signal receiving step for receiving a response signal from the chip of the group designated in the designation signal via the antenna.

* * * * *